United States Patent [19]

Sims

[11] 4,146,243
[45] Mar. 27, 1979

[54] EXTRA FLOTATION DEVICE FOR SELECTIVELY PROVIDING AUXILIARY GROUND SUPPORT FOR LOAD-BEARING VEHICLES

[76] Inventor: Royal W. Sims, 6451 Holladay Blvd., Salt Lake City, Utah 84121

[21] Appl. No.: 869,578

[22] Filed: Jan. 16, 1978

[51] Int. Cl.² .............................................. B60S 9/00
[52] U.S. Cl. ............................ 280/81 R; 180/24.02; 280/43.23
[58] Field of Search ............... 280/80 R, 81 A, 81 R, 280/43.23; 180/24.02

[56] References Cited

U.S. PATENT DOCUMENTS

| | | | |
|---|---|---|---|
| 3,912,293 | 10/1975 | Harbers | 280/81 R |
| 4,063,779 | 12/1977 | Martin et al. | 280/81 R X |
| 4,082,305 | 4/1978 | Allison et al. | 280/81 R |

Primary Examiner—Richard A. Bertsch
Assistant Examiner—Michael Mar
Attorney, Agent, or Firm—John A. Young

[57] ABSTRACT

The frame of a load-bearing vehicle has two beams extending one on each side of the frame and pivotally mounted to the frame. Between each beam and the frame is an air bladder, or other cushion. At the end of each beam is a linkage carrying a tag axle, wheel and tire. A power actuator rotates the linkage to bring the wheel and tire into ground engaging position at the end of the beam, and a second power actuator pivots the beams upwardly to raise the wheel-and-tire set; or pivots the beam downwardly to lower the wheel-and-tire set into ground engagement. Fluid motor actuators for the linkages and the beams respectively, are remotely operable so that the extra flotation wheels and tag axle can be brought into ground engagement when additional ground support is desired for the weight borne by the vehicle frame; or, the extra flotation wheels and tires can be raised to an elevated transport position, also by remote operation of the fluid motor actuators associated with the beam and linkage respectively.

11 Claims, 9 Drawing Figures

EXTRA FLOTATION DEVICE FOR SELECTIVELY PROVIDING AUXILIARY GROUND SUPPORT FOR LOAD-BEARING VEHICLES

BACKGROUND OF THE INVENTION

1. Field of the Invention

This invention relates to flotation devices and, more particularly, to auxiliary flotation devices which can selectively provide additional ground support for load-bearing vehicles.

2. Description of Prior Art

In prior art proposals, extra flotation devices have been used wherein the tag axle and wheels are raised to such an elevated position that in relation to the center of gravity of the vehicle, there is created an unstable condition during transport while the wheels are in their raised or elevated position. In still other flotation devices, the additional support mechanism for the added wheels is telescoped within the frame of the vehicle during transport. In still other prior art devices, when it is desired to secure extra flotation or ground support for the load-bearing vehicle, the extra flotation wheels are extended to the rear of the vehicle and the tires, mounted on a tag axle, are brought into ground engagement so that the vehicle is additionally supported.

As part of the functional requirements for a satisfactory tag axle, the extra flotation device must be stable and readily positionable in ground engagement and then raised to a second position known as the "transport" position. While positioned in transport mode, the extra flotation wheels should interfere as little as possible with the other functions of the vehicle. While these objectives appear at first blush to be simple and easily attainable, they are by no means obvious and have, indeed, occupied the art for a considerable period of time without an entirely satisfactory solution.

SUMMARY OF THE INVENTION

It is an object of the present invention to provide an extra flotation tag axle which is mounted on a pair of pivoted beams extending rearwardly of the frame of the vehicle, such beams being pivotally mounted on the frame and having cushioning means between the frame and beams to cushion the ground support provided through said extra flotation tag axle.

Another object of the invention is to provide at the rearwardly projected ends of said beams a linkage which is operated by a fluid motor actuator adapted to swing the tag axle and wheel-and-tire from a retracted (raised) position to a downward position adapted to be ground engageable when the pivoted beams are lowered.

An important feature of the linkage is that it includes a chain forming a transmitting connection between the power actuator and the linkage to rotate the tag axle in one direction which serves to elevate the wheel and tires, and a com-and-cam-follower connection between the power actuator and linkage, which is used for counterrotating the wheel and tire into a ground engageable position wherein the linkage is internested with the beam and therefore reinforced in its connection with the beam. There results a stable ground support between the wheel carried by the linkage and the beam which is secured to the frame for additional flotation for the vehicle.

Another and overall object of the present invention, is to provide a transport position for the wheel and tire which is not excessively elevated in relation to the center of gravity of the vehicle as to cause either unstable riding or unstable cornering abilities for the vehicle. A related object is that when the extra flotation device is in ground support, it will provide stable additional ground support for the vehicle, and will not tend to chatter or vibrate while the vehicle moves with this additional ground support.

It is an important feature of the present invention that the device is both compact and remotely operative to be brought between a compact retracted position in which the wheels are elevated and out of ground contact and then are brought into ground engagement by remote operation of power devices to give the vehicle the additional flotation it needs to support the vehicle load.

Other objects and features of the present invention will become apparent from a consideration of the following description which proceeds with reference to the accompanying drawings.

DRAWINGS

DETAILED DESCRIPTION OF PREFERRED EMBODIMENT

Figure 1:
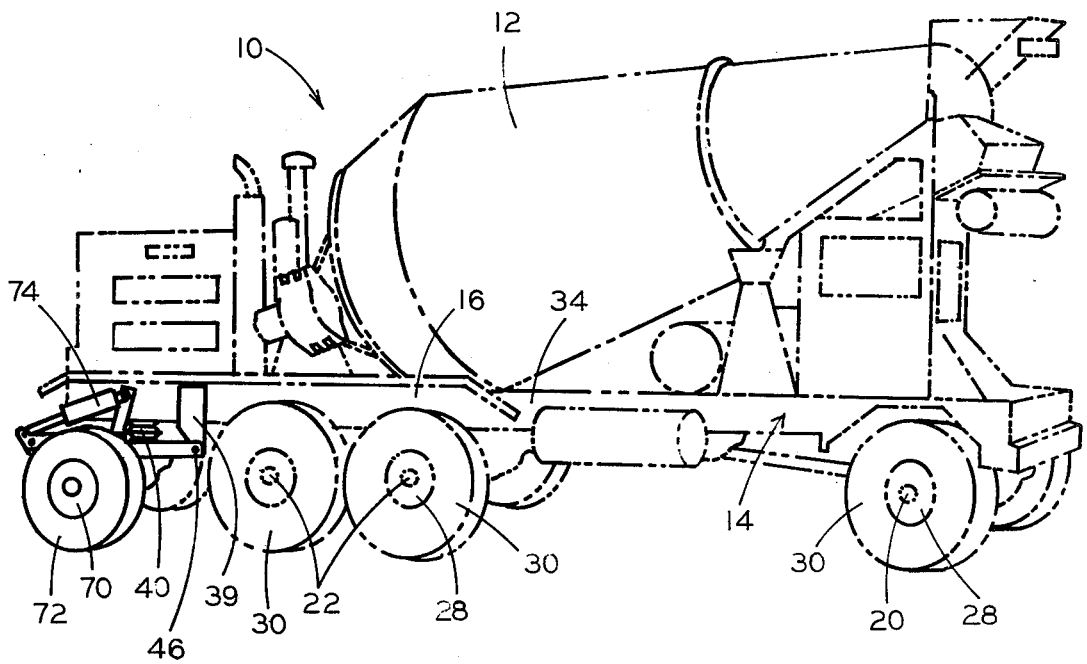
FIG. 1 is a perspective view of a load-bearing vehicle, in this case a mobile, self-propelled concrete mixer unit which incorporates the invention.

Referring to FIG. 1, a self-propelled transit concrete mixer designated generally by reference numeral 10, has bowl 12 which is mounted for rotation on chassis 14 which includes a frame 16. The frame 16 supports front 20 and rear 22 axles. Each of the axles has at least one and generally two pairs of wheels 28, with ground engaging tires 30 which support the vehicle and associated load.

Figure 4:
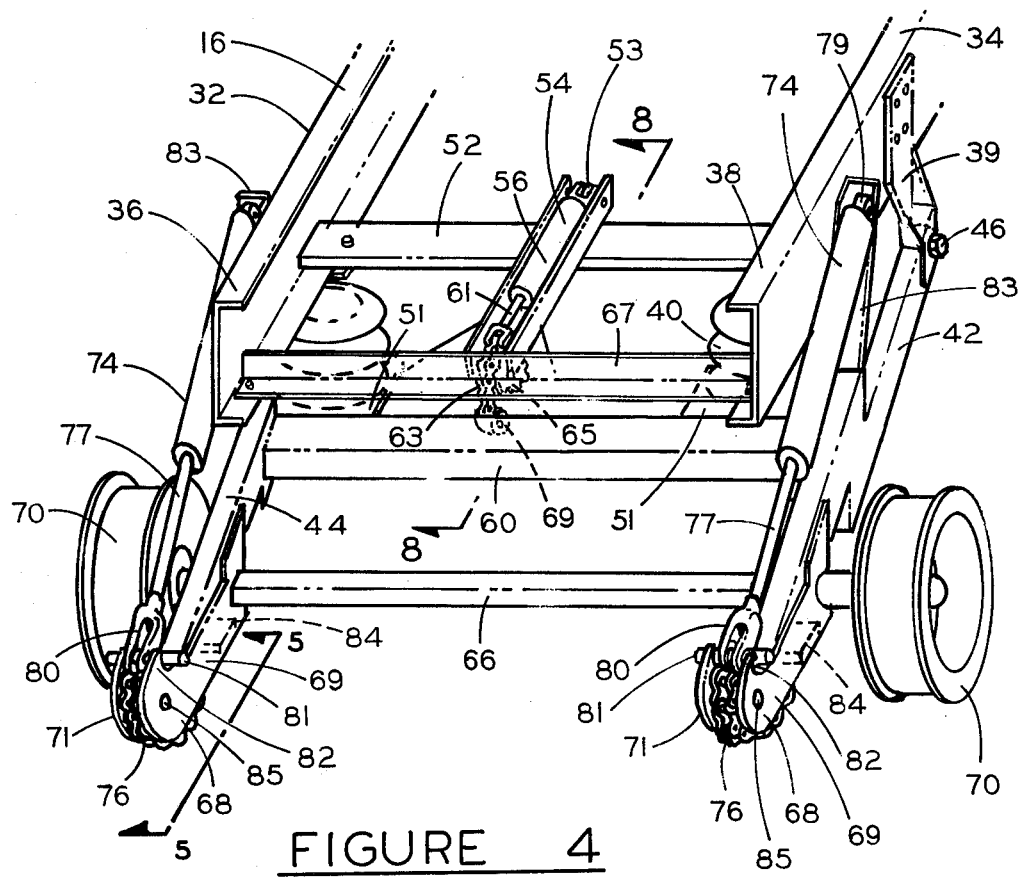
FIG. 4 is a perspective view of the mechanism shown fully lowered and with the wheel in position for ground contact and providing extra flotation for the load of the vehicle.
Figure 7:
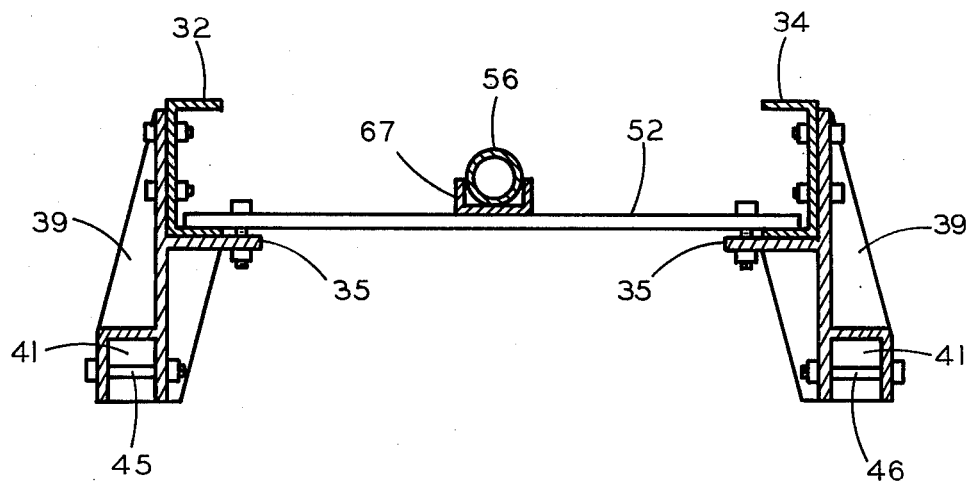
FIG. 7 is a transverse section view taken on line 7—7 of FIG. 8.

As shown in FIG. 4, the frame 16 includes two side rails or beams 32 and 34, and at the ends 36 and 38 thereof, are depending brackets 39 welded to the rails 32, 34. The brackets 39 are recessed at 41 on the lower edge (FIG. 7). An abutment 35 engages the undersurface of the side rail to transfer load to the frame 16. Linkage beams 42, 44 are mounted on the brackets 39 in recess 41 through pivot connections 46 and 48. The brackets 39 thus connect the linkage beam 42, 44 to the side rails 32, 34 of the frame 16.

An inflatable air bag 40 for each linkage beam 42, 44 provides a cushioned support for the extra flotation wheels. The air bags 40 are mounted between a plate 51 secured to each pivotal linkage beam 42, 44 and the associated side rails 32, 34 to yieldably resist angularly upward movement of the linkage beams 42, 44 and thereby cushion vertical load support for the vehicle 10. The air bags can be inflated to whatever pressure is needed to have the correct load weight on each axle.

Between the two rails 32, 34 is a cross beam 52 and remotely operable fluid pressure controlled power actuator 54 with a cylinder 56 having extendable piston rod 61. The cylinder is pivotally attached by a clevis 53 to a lug 65 on cross beam 67. A wrist pin connection 64 permits slight pivoting of the cylinder 56. The beams 42, 44 are pivoted upwardly (FIG. 2) upon protractile movement of the piston rod 61. The piston rod 61 has a chain 63 passing over a sprocket wheel 65 on cross beam 67 and end 69 of the chain is connected to cross beam 60 which is fastened between the two linkage beams 42, 44 to lift the tag axle 66 (FIG. 2) against the resistance of air bags 40 when the power actuator 54 is operated.

The power actuator 54 is operated in one direction or the other by remotely controlled actuator means located either at the cab or the side of the vehicle.

Figure 8:
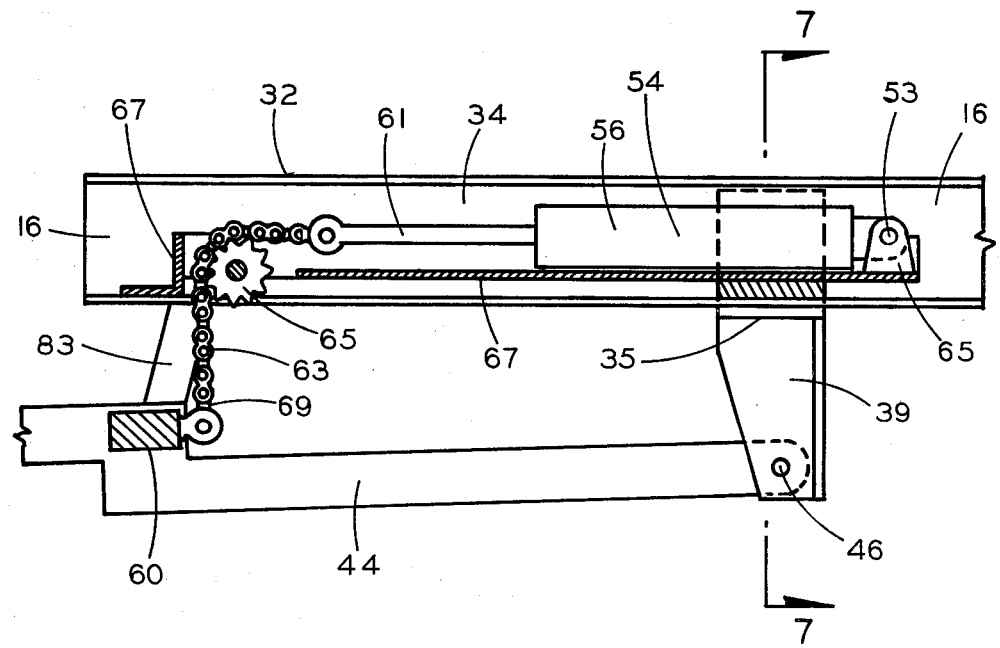
FIG. 8 is a sectional detail view of the raising and lowering mechanism for the linkage beams taken on line 8—8 of FIG. 4.

When it is desired to bring extra flotation downwardly into operative position, the piston rod 61 (FIG. 8) is extended and the tag axle 66 is lowered; conversely, when it is desired to move the tag axle 66 and extra flotation upwardly to transport position, the piston (not shown) within the power cylinder 56 is moved in a retractile direction and acts through chain 63 passing over sprocket 65 on cross member 67. The end 69 of chain 63 is attached to cross member 60 of the flotation device, thus pivoting the linkage beams 42, 44 upwardly together with the associated wheels 70, 70 and tires 72, 72. The piston is moved in the opposite direction to raise the flotation device. The piston rod 61, acting through the chain 63 draws the cross member 60 upwardly, pivoting arms 42, 44 upwardly above pivots 46 against the resistance of air bags 40 and raising the wheels 70, 70 and tires 72, 72.

Figure 3:
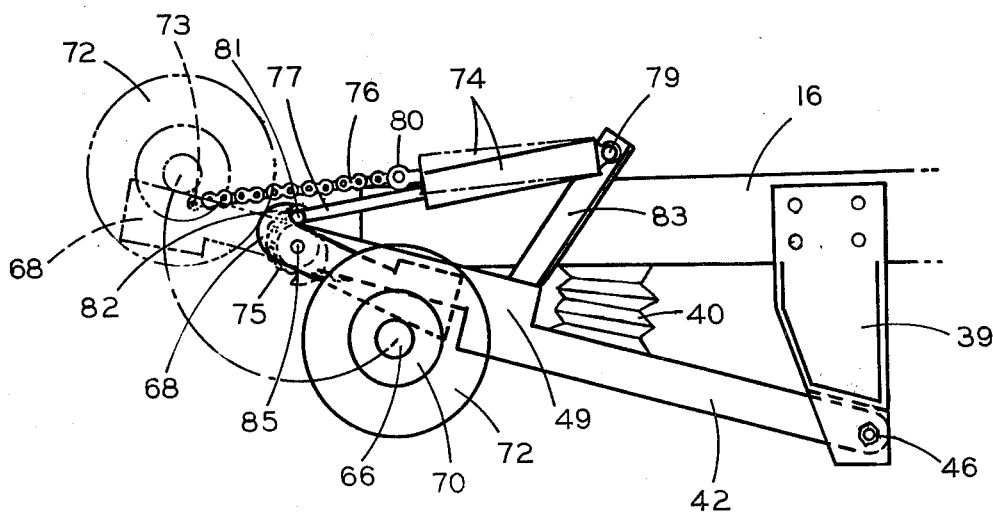
FIG. 3 illustrates in full line and dotted lines the next stages of retraction of the mechanism in FIG. 2.
Figure 5:
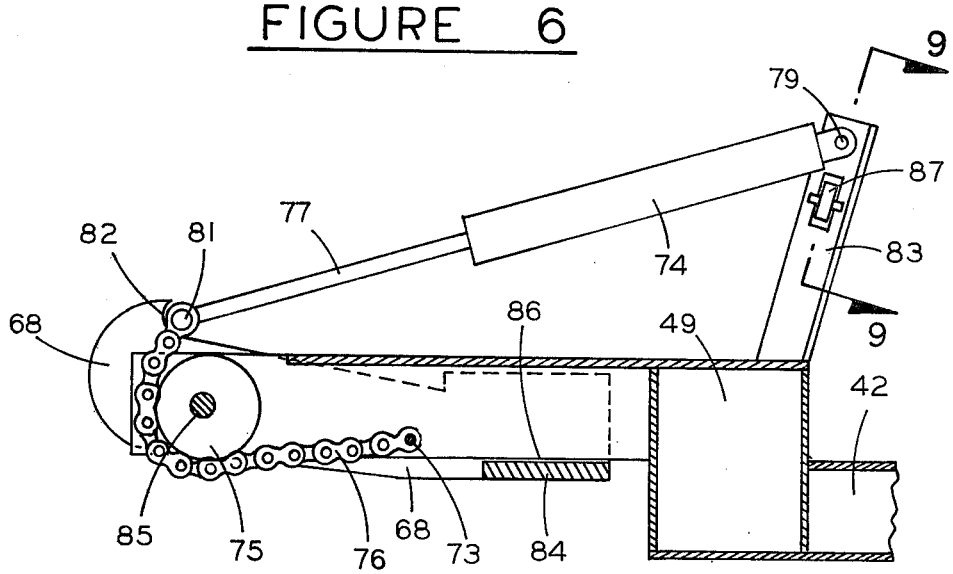
FIG. 5 is a detail view of the linkage taken on line 5—5 of FIG. 4, showing a portion of the linkage broken to illustrate details thereof.

At the end of each beam is a pivoted arm 68 receiving opposite ends of tag axle 66 and extra flotation wheels 70, 70 and tires 72, 72 carried thereon. Each arm 68 (FIG. 5) has a fluid motor actuator 74 and a chain 76 secured thereto at 73 (FIG. 5). The actuators have trunnion mountings 79 on arms 83 which are welded to linkage beams 42, 44. The chain 76 passes slideably over spools 75 (FIG. 5) at the ends of the linkage beams 42, 44 so that when the piston rod 77, secured to the chain 76 through a clevice 80, is retracted, it will communicate through the chain a pivotal movement of the arm 68 and hence the associated tag axle 66, wheels 70, and tires 72, bringing them to an upward position (FIG. 3). When the piston rod 77 is extended, the arm 68 will counterrotate (FIG. 3), allowing the wheels 70, tires 72, and tag axle 66 to counterrotate of their own weight. This counterrotation (FIG. 3) is permitted by the chain 76 as it passes over spool 75 (FIG. 5).

After the extra flotation wheel 70 and tag axle 66 have counterrotated under their own weight, a cam 81 at the end of the piston rod 77 engages a cam follower 82 on the arm 68 so that further extendable movement of the piston rod 77 acting through the cam follower 82 on the arm 68 produces additional counterrotation of the arm 68, doubling the arm 68 back so that the two side plates 69, 71 thereof move into sliding side-by-side contact with opposite side faces of the linkage beams 42, 44. When fully retracted, an abutment 84 (FIG. 5) on the arm 68 engages a stop 86 on the beam 42. Thus, the arm 68 is internested with the beam 42 and resists any lateral movement as it provides ground engaging support for each extra flotation wheel 70, 72 and tag axle 66.

The additional ground flotation support provided by the extra flotation wheels 70 is carried from the ground upwardly through the wheels 70 and tag axle 66 into the linkage beams 42, 44 thence through the inflatable cushioning supports 40 carried on mounting platforms 51 (integral with 42, 44) to the frame 16 and chassis 14. The point of ground engagement for the extra flotation wheels is spaced sufficiently rearwardly of the rearmost axle 22 (FIG. 1) to be in the order of 6½ to 7 feet, so that not only is the loading on axle 22 relieved, once the extra flotation gear is lowered into operative position, but also spacing for the axles 20, 22, 22, 66 is sufficiently apart to comply with the bridging laws of many of the states under existing regulations. These regulations dictate not only prescribed load per axle, but prescribed load on a displacement basis between respective axles, i.e., the so-called "bridge" law requirements.

The wheels are castered so that they will "track". The wheels may be equipped with brakes and are steerable when desired. Likewise, the wheel axles can be fixed as well as being steerable.

OPERATION

Figure 2:
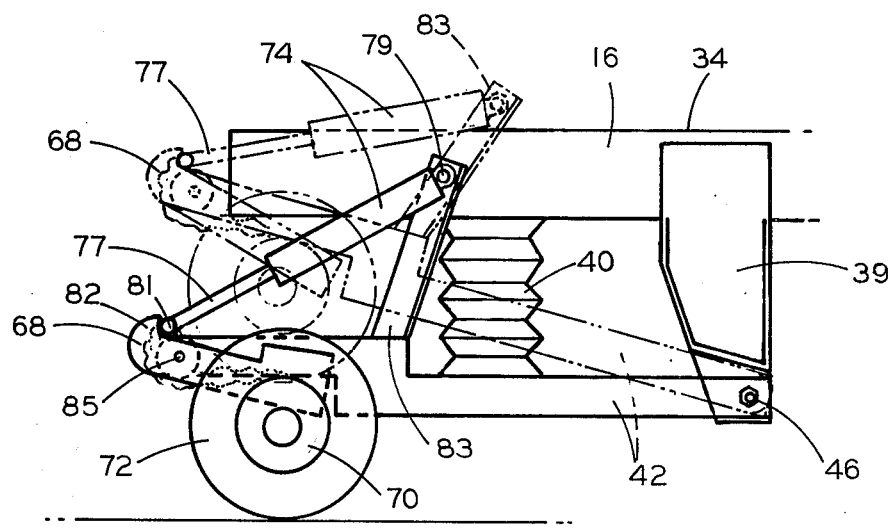
FIG. 2 is a detail view illustrating the extra flotation device in side elevation view and with the device shown in full line for extra flotation and in dotted line position for the first phase of retraction of the device.

When a vehicle is loaded to the extent that additional flotation is needed to relive the per-axle loading, the device is actuated from the dotted line position shown in FIG. 3 in which the extra flotation tires 72, wheels 70, tag axle 66, and arms 68 are elevated to the full-line position shown in FIG. 3 and then to the full line position of FIG. 2, by first actuating the fluid motor actuators 74 associated with each wheel in an extending direction. The piston rods 77 are extended and the chains 76 associated with each tag axle allow the associated extra flotation wheel and tag axle to be rotated from an elevated to a lowered position by their own weight. Once the extra flotation tire and tag axle have rotated by their own weight to the maximum extent permitted by the chain associated with the piston rod, further movement of the piston rod (FIG. 3) causes engagement of a cam 81 on the end of the piston rod with a cam follower 82 on the arm 68 so that further extension of the piston rod rotates the arm about pivot pin 85 and causes spaced sides of the arm 68 to become internested with opposite sides of the beams 42, 44.

Internesting of the arms 68 and beams 42, 44, together with engagement of abutment 84, on the arm, with complementary stop 86 on the beam, produces a strong reinforced connection against lateral movement of the tag axle and permits the tag axle 66 and attached extra flotation wheels 70 to bear a substantial portion of the ground load.

When the arms 68 are fully internested with the linkage beams 42, 44, the beams 42, 44 are then pivoted downwardly by the air bags 40 when the power actuator 54 is extended to permit the air bags to expand. The air bags 40 lower the wheels 70 and tires 72 into ground engagement (dotted line to full line position in FIG. 2). As shown in FIGS. 2, 3, each linkage beam 42 is offset vertically at 49 in the vicinity of the beams 42 connection with cross beam 60 (FIG. 4).

Figure 9:
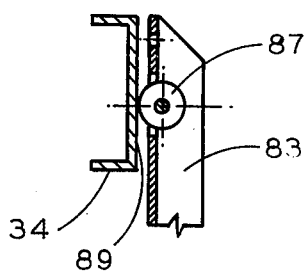
FIG. 9 is a partial sectional detail view showing the bearing arrangement between the upright attachment on each linkage beam and the confronting beam surface to stabilize the flotation device against lateral distortion.

Each linkage beam 42, 44 has an upwardly projecting attachment 83 which provides mounting 79 for the fluid motor actuator 74 (FIG. 5) associated with each linkage beam 42, 44 and moves in unison with the linkage beams 42, 44. Each attachment has a bearing 87 (FIG. 9) in antifriction rolling contact with the confronting surface 89 of rails 32, 34 to provide for the described angular movement of linkage beams 42, 44 about 46 but stabilizing such cushioning for the extra flotation provided by wheels 70 is effected by an inflatable bag 40 which cushions road shock between the beams 42, 44, chassis 14, and frame 16.

Once the wheels 70 are in ground engagement, there is redistribution in axle loading of the vehicle because part of the ground load is taken by tag axle 66, linkage beams 42, 44 and then air bags 40 into frame 16. The tag axle 66 is spaced at the rearmost part of the vehicle, so there is a distribution of load not only on a per-axle basis, but the spacing of the axles is sufficient to assist in attaining compliance with state laws which relate to load per axle together with longitudinal spacings of the loaded axles, i.e., the "bridging" laws.

The linkage beams 42, 44 and arms 68 rotate and counterrotate the tag axle and wheels at the end of the beam, and are operated by actuators 74 which first bring the extra flotation wheels into operative position by dropping and then conveying them from dotted to full line position (FIG. 3). Power actuator 56 then swings the beams 42, 44 downwardly (dotted line to full line position, FIG. 2). The cylinders 56, 74, 74 are operated by controls either at the front of the vehicle or at the cab of the vehicle. Such controls are shown in FIG. 6.

Figure 6:
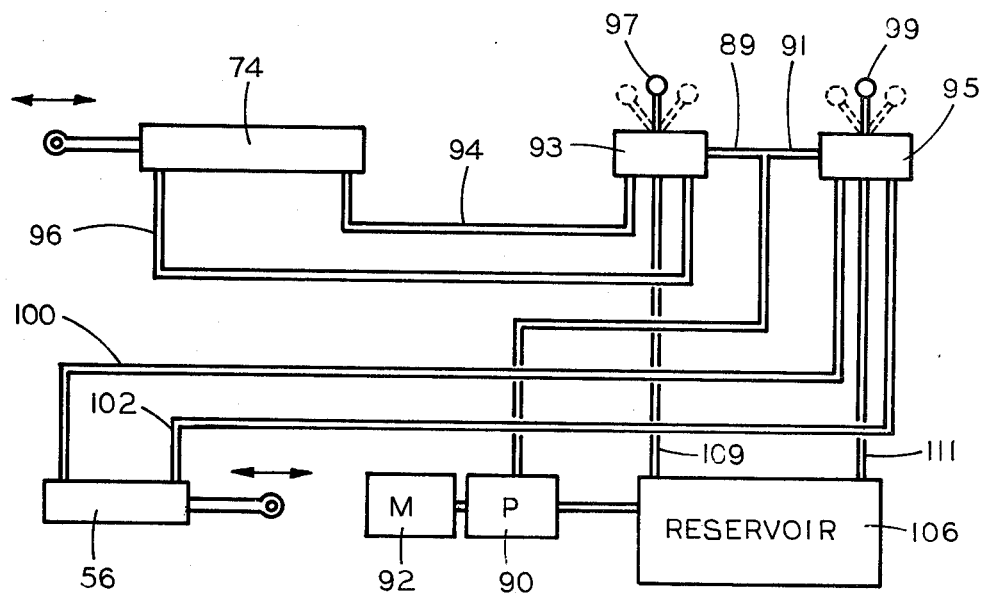
FIG. 6 is a schematic view illustrating the hydraulic controls for operating the power cylinders.

Referring to FIG. 6, hydraulic pump 90 driven by motor 26 has hydraulic connections 89, 91 with control valves 93, 95 operated by control levers 97, 99. The control valve 93 having a control lever 97 includes hydraulic connections 94 and 96 with opposite ends of fluid motor actuator 74 (one of which is shown in FIG. 7) are associated with each of the arms 68. The other control valve 95 has hydraulic connections 100 and 102 with power cylinder 56 for pivotally actuating the pivoted beams 42, 44. Each control valve 93, 95 includes a hydraulic line 109, 111 connecting with reservoir 106.

When it is desired to operate the power cylinders 74 associated with the linkage arms 68, control lever 97 is operated communicating hydraulic pressure from the control valve 93 through line 94 to operate power cylinder 74. The control can likewise come through line 96 to pump pressure to retract the power cylinder 74 to effect operation of the arms 68 moving the tag axle to transport position, i.e., from full line to dotted line position in FIG. 3.

When it is desired to lower or raise linkage beams 42, 44, the control lever 99 is operated to effect hydraulic connections through the valve 95 communicating pump pressure through one or the other of lines 100, 102 to the power cylinder 54 associated with the beams 42, 44. The power cylinder thereby effects pivotal movement of the linkage bemas 42, 44 either in a raising or lowering direction, i.e., from dotted line to full line, or full line to dotted line positions (FIG. 2), depending upon which of the two lines 100, 102 are communicated with hydraulic pressure. In this manner, the hydraulic actuators 54, 74, 74 are remotely operable either from the cab of the vehicle or from the side of the vehicle by one or the other of the control levers 97, 99.

From the foregoing description, it should be clear that the device can be provided either as original vehicle equipment or can be used to retrofit existing vehicles to provide additional flotation which will reduce per-axle loading and shift axle loading on the basis of axle displacement to bring a given vehicle load within the bridge law requirements of the various states.

Although the invention has been illustrated and described in connection with a few selected example embodiments, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents of the invention.

What is claimed is:

1. A tag axle adapted to provide selectively, additional flotation for a load-bearing vehicle comprising in combination with a vehicle frame;

two beam members extending rearwardly of said frame one from each frame side thereof, and each having a ground-engaging wheel, tire, and tag axle;

means for mounting said beams for angular movement thereof in a vertical plane;

power actuated first means for lowering and raising said beam members;

resilient cushioning means between said frame and each of said beams to provide cushioned support for ground loads transferred through the wheel and tire through said beam members to said frame and thereby providing additional cushioned ground support for said frame and the load-bearing therein;

articulated linkage means between the respective extended ends of said beams and the associated wheel and tire at each side of said frame; and, power actuated second means for rotating said articulated linkage means to a first position wherein said wheels are elevated out of ground engageable position and for counterrotating said articulated linkage means to a second position wherein said wheels are disposed for ground engagement.

2. The construction in accordance with claim 1 wherein said power actuated means for rotating said articulated linkage means includes a power cylinder piston and piston rod having a cam, a cam follower portion of said articulated linkage means engageable by said cam to rotate said articulated leverage means relatively to its associated beam and thereby provide a stable position for the wheel and tire thereon as the linkage is interlocked with its associated beam to transfer ground reaction force from the wheel first directly to the associated pivoted beam and then to said frame through said cushioning means.

3. The construction in accordance with claim 1, wherein said articulated linkage means includes a flexible linkage between said power cylinder and said articulated linkage means whereby such articulated linkage means is counterrotated from ground engageable position to an elevated transport position wherein said wheels and tires are out of ground engagement and are raised sufficiently to be raised completely out of ground contact.

4. The tag axle in accordance with claim 1 including a stop between said articulated linkage means and said beam to provide a positive force transmitting connection between the ground engaging wheel and said beam, and means forming a sliding interconnection between said beam and articulated linkage means prohibiting lateral movement while the extra flotation wheels on said articulated linkage means are in ground engagement.

5. The tag axle in accordance with claim 1 including a chain operatively connected at one end to said power actuated means and at the other end to said articulated linkage means whereby during retractile movement of said power actuated means the associated tag axle and extra flotation wheel and tires mounted thereon are elevated out of ground engagement, and a cam on said power actuated means adapted during protractile movement of said power actuated means, to engage a cam follower portion of said articulated leverage means, to rotate said articulated leverage means and the associated tag axle and wheel into ground engaging position relative to said beam, and power actuated means for operating said beams between a raised and a lowered position wherein said wheels are adapted to provide additional load bearing for the vehicle through said vehicle frame.

6. The apparatus in accordance with claim 5 including additional power actuated means for effecting angular movement of said beams which cause raising and lowering movements of the wheel and tires mounted at the ends thereof when said wheels and tires are disposed by the associated linkage means in positions adapted for ground engagement.

7. The apparatus in accordance with claim 1 including means for laterally connecting said beams to provide lateral stable support for the extra flotation.

8. The apparatus in accordance with claim 1 wherein said beams include longitudinally offset portions and integrally related transverse platform means adapted to receive said resilient cushioning means thereon.

9. A process for providing extra flotation for load bearing vehicles having a frame and comprising the steps of: mounting a pair of beams extending rearwardly of the vehicle frame and each having a cushioning member disposed between a respective beam and said frame, rotating above the extended end of said beam an articulated linkage having a ground engaging wheel at the remote end thereof through a first power actuated means, such rotation being in one direction about the extended end of said beam to bring the associated wheel and tire into ground engaging position in which the linkage is nested firmly with the associated beam for lateral support, selectively counterrotating said articulated leverage means to bring the associated extra flotation wheel and tire out of ground engageable position relatively to the extended end of the beam, and thereafter selectively raising and lowering, through a second power actuated means, the beam relative to the frame between a transport raised position in which the extra flotation tag axle wheels are disposed vertically in out-of-ground engagement position to a lowered position wherein the wheels are in ground support position to provide additional flotation for the vehicle.

10. The process in accordance with claim 9 including the step of remotely operating the actuator means associated with said beams and said articulated linkage to selectively position the ground engageable wheels of the tag axle either in ground engageable position for extra flotation of the vehicle and its associated load or elevating said tag axle and wheels by counterrotating both on said frame through said articulated linkage whereby the extra flotation tires and wheels are in an elevated non-ground engageable position.

11. A tag axle adapted to provide selectively, additional flotation for a load-bearing vehicle comprising in combination with a vehicle frame:
two beam members extending rearwardly of said frame one from each frame side thereof, and each having a ground-engaging wheel, tire, and tag axle;
means for mounting said beams for angular movement thereof in a vertical plane;
power actuated first means for lowering and raising said beam members;
resilient cushioning means disposed between said frame and each of said beams to provide independently of said first power actuated means cushioned support for ground loads transferred through the wheel and tire through said beam members to said frame and thereby providing additional cushioned ground support for said frame and the load-bearing therein;
articulated linkage means between the respective extended ends of said beams and the associated wheel and tire at each side of said frame; and,
power actuated second means for rotating said articulated linkage means to a first position wherein said wheels are elevated out of ground engageable position and for counterroating said articulated linkage means to a second position wherein said wheels are disposed for ground engagement.

* * * * *